(12) United States Patent
Shin et al.

(10) Patent No.: US 10,604,154 B2
(45) Date of Patent: Mar. 31, 2020

(54) VEHICLE AND METHOD OF CONTROLLING THE SAME

(71) Applicant: HYUNDAI MOTOR COMPANY, Seoul (KR)

(72) Inventors: Kicheol Shin, Seongnam-si (KR); MyungSeon Heo, Seoul (KR); Youngchul Oh, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/055,206

(22) Filed: Feb. 26, 2016

(65) Prior Publication Data

US 2017/0120911 A1    May 4, 2017

(30) Foreign Application Priority Data

Oct. 28, 2015 (KR) .................. 10-2015-0150030

(51) Int. Cl.
*B60W 30/16* (2012.01)

(52) U.S. Cl.
CPC .......... *B60W 30/16* (2013.01); *B60W 2420/52* (2013.01); *B60W 2550/308* (2013.01); *B60W 2720/10* (2013.01); *B60W 2750/308* (2013.01)

(58) Field of Classification Search
CPC .......... G05D 1/0246; G05D 2201/0213; G05D 1/0212; G05D 1/0253; G05D 1/0287; G05D 2201/02; G05D 1/0214; G05D 1/0242; G05D 1/00; G05D 1/0022; G05D 1/0038; G05D 1/0044; G05D 1/021; G05D 1/0223; G05D 1/0231; G05D 1/024; G05D 1/0248; G05D 1/0255
See application file for complete search history.

(56) References Cited

U.S. PATENT DOCUMENTS

2010/0256852 A1*  10/2010  Mudalige ............... G08G 1/163
                                                       701/24

FOREIGN PATENT DOCUMENTS

| JP | H05-342500 A | 12/1993 |
|---|---|---|
| JP | 3015391 B2 | 3/2000 |
| JP | 2002-303668 A | 10/2002 |
| JP | 2004-58994 | 2/2004 |
| JP | 2004-301833 A | 10/2004 |
| JP | 2004-330890 | 11/2004 |
| JP | 2007-084056 A | 4/2007 |
| JP | 2009-1245 | 1/2009 |
| JP | 2013-164795 | 8/2013 |

(Continued)

OTHER PUBLICATIONS

Korean Office Notice of Allowance dated Apr. 26, 2017 from the corresponding Korean Application No. 10-2015-0150030, with translation, 6 pp.

*Primary Examiner* — Hussein Elchanti
*Assistant Examiner* — Paul A Castro
(74) *Attorney, Agent, or Firm* — Brinks Gilson & Lione (57) ABSTRACT

A vehicle adjusts a distance between a subject vehicle and a front vehicle according to a height of the front vehicle. The vehicle includes a distance sensor, and a processor which determines data of the front vehicle among data obtained by the distance sensor, and maintains a distance to the front vehicle equal to or more than a predetermined distance when a longitudinal dispersion value of the determined data is a predetermined reference value or more.

13 Claims, 11 Drawing Sheets

(56) References Cited

FOREIGN PATENT DOCUMENTS

| JP | 2013-253923 A | 12/2013 |
|---|---|---|
| KR | 10-2015-0104409 A | 9/2015 |

* cited by examiner

VEHICLE AND METHOD OF CONTROLLING THE SAME

CROSS-REFERENCE TO RELATED APPLICATION

This application claims priority to and the benefit of Korean Patent Application No. 10-2015-0150030, filed on Oct. 28, 2015, which is incorporated herein by reference in its entirety.

FIELD

The present disclosure relate to a vehicle and a method of controlling the same.

BACKGROUND

The statements in this section merely provide background information related to the present disclosure and may not constitute prior art.

In general, auxiliary driving devices provide a function which assists vehicle control in the longitudinal direction using an adaptive cruise control (ACC), or assists vehicle control in the lateral direction using a lane departure warning system (LDWS) or lane keeping auxiliary system (LKAS).

Recently, autonomous driving vehicles for automatically controlling a vehicle in the longitudinal or lateral direction without driver intervention have been developed.

Meanwhile, in controlling a vehicle in the longitudinal direction, cases in which the distance between the vehicle and a vehicle in front is erroneously sensed and differs from the actual distance can occur due to varying the height of the vehicle in front.

SUMMARY

The present disclosure provides a vehicle capable of adjusting a distance between a subject vehicle and a front vehicle according to a height of the front vehicle, and a method of controlling the same.

Additional aspects of the present disclosure will be set forth in part in the description which follows and, in part, will be obvious from the description, or may be learned by practice of the present disclosure.

In accordance with one aspect of the present disclosure, a vehicle includes a distance sensor, and a processor which determines data of a front vehicle among data obtained by the distance sensor, and maintains a distance to the front vehicle equal to or more than a predetermined distance when a longitudinal dispersion value of the determined data is a predetermined reference value or more.

The processor may calculate an average distance from the distance sensor to a data point of the front vehicle, and calculate a longitudinal dispersion value of the data of the front vehicle based on the average distance.

The processor may calculate an average distance from the distance sensor to a data point of the front vehicle, and maintain a distance to the front vehicle equal to or more than the predetermined distance when a distance between a data point of the front vehicle closest to the distance sensor and the average distance is a predetermined reference distance or more.

The processor may calculate the distance to the front vehicle to decrease the dispersion value to a value less than the predetermined reference value, and maintain the distance to the front vehicle equal to or more than the calculated distance when the dispersion value is the predetermined reference value or more.

The distance sensor may include a multi-layer light detection and ranging (multi-layer LiDAR) device.

The processor may estimate a trajectory of a subject vehicle, and determine that a vehicle positioned on the estimated trajectory is the front vehicle.

The processor may determine a lane in which a subject vehicle is being driven using data sensed by the distance sensor, and determine that a vehicle being driven on or entering the determined lane is the front vehicle.

The vehicle may further include a driving device which drives a vehicle so that the distance to the front vehicle is maintained to be the predetermined distance or more when the dispersion value of the determined data is the predetermined reference value or more.

In accordance with another aspect of the present disclosure, a vehicle includes a distance sensor, and a processor which determines whether a height of a front vehicle is a predetermined vehicle height or more based on data obtained by the distance sensor, and maintains a distance to the front vehicle equal to or more than a predetermined distance when the height of the front vehicle is the predetermined vehicle height or more.

The processor may determine data of the front vehicle among data obtained by the distance sensor, and determine that the height of the front vehicle is the predetermined vehicle height or more when a longitudinal dispersion value of the determined data is a predetermined reference value or more.

The processor may calculate an average distance from the distance sensor to a data point of the front vehicle, and calculate a longitudinal dispersion value of the data of the front vehicle based on the average distance.

The processor may calculate an average distance from the distance sensor to a the data point of the front vehicle data, and determine that the height of the front vehicle is the predetermined vehicle height or more when a distance between a data point of the front vehicle closest to the distance sensor and the average distance is a predetermined reference distance or more.

In accordance with another aspect of the present disclosure, a method of controlling a vehicle includes determining a front vehicle using data obtained by a distance sensor, determining whether a height of the determined front vehicle is a predetermined vehicle height or more, and maintaining a distance to the front vehicle equal to or more than a predetermined distance when the height of the front vehicle is the predetermined vehicle height or more.

The determining whether the height of the determined front vehicle is the predetermined vehicle height or more may include calculating a longitudinal dispersion value of data of the front vehicle, and determining that the height of the front vehicle is the predetermined vehicle height or more when the calculated longitudinal dispersion value is a predetermined reference value or more.

The calculation of the longitudinal dispersion value of the front vehicle data may include calculating an average distance from the distance sensor to a data point of the front vehicle, and calculating a longitudinal dispersion value of the data of the front vehicle based on the average distance.

The determining whether the height of the front vehicle is the predetermined vehicle height or more may include determining that the height of the front vehicle is the predetermined vehicle height or more when a distance between a data point of the front vehicle closest to the distance sensor and the average distance is a predetermined reference distance or more.

The determining of the front vehicle using the data obtained by the distance sensor may include estimating a trajectory of a subject vehicle, and determining that a vehicle positioned on the estimated trajectory is the front vehicle.

The determining of the front vehicle using the data obtained by the distance sensor may include determining a lane in which a subject vehicle is being driven using data sensed by the distance sensor, and determining that a vehicle being driven on or entering the determined lane is the front vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
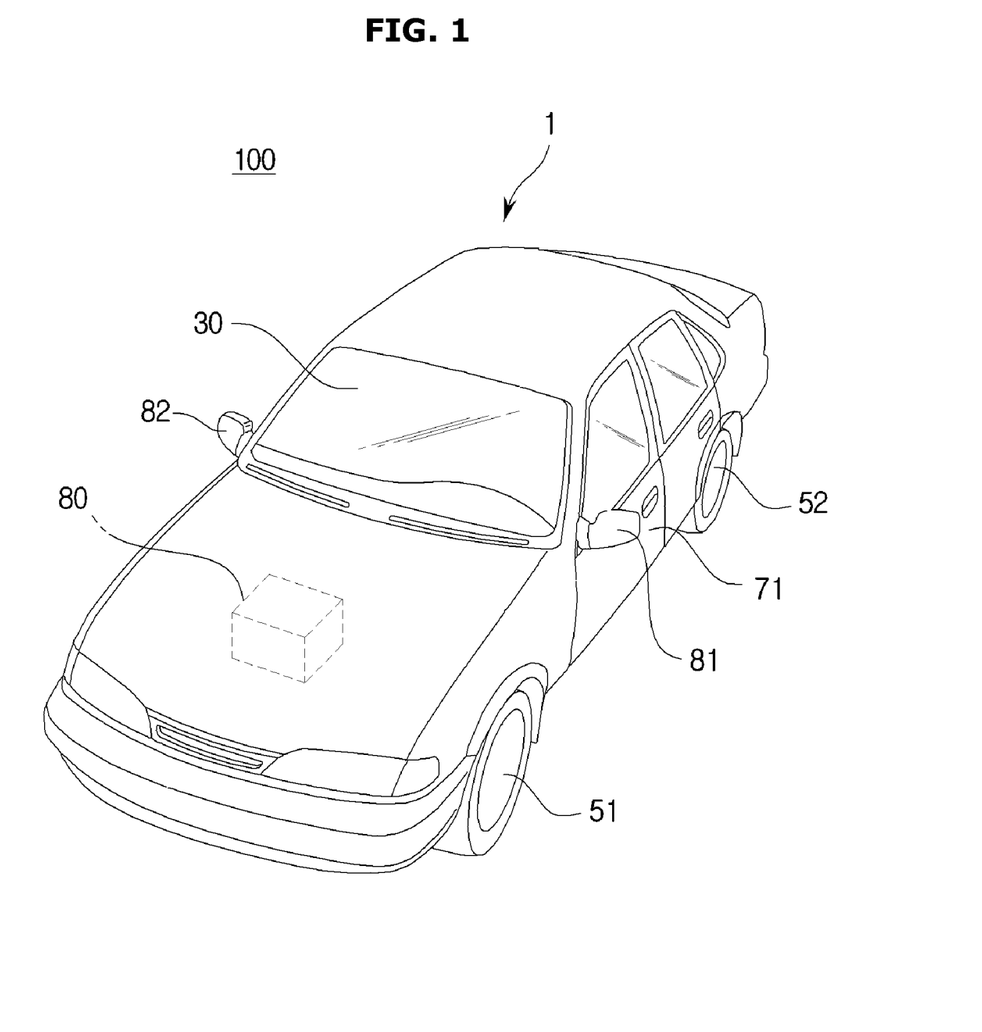
FIG. 1 is a view illustrating an exterior of a vehicle according to the present disclosure.
Figure 2:
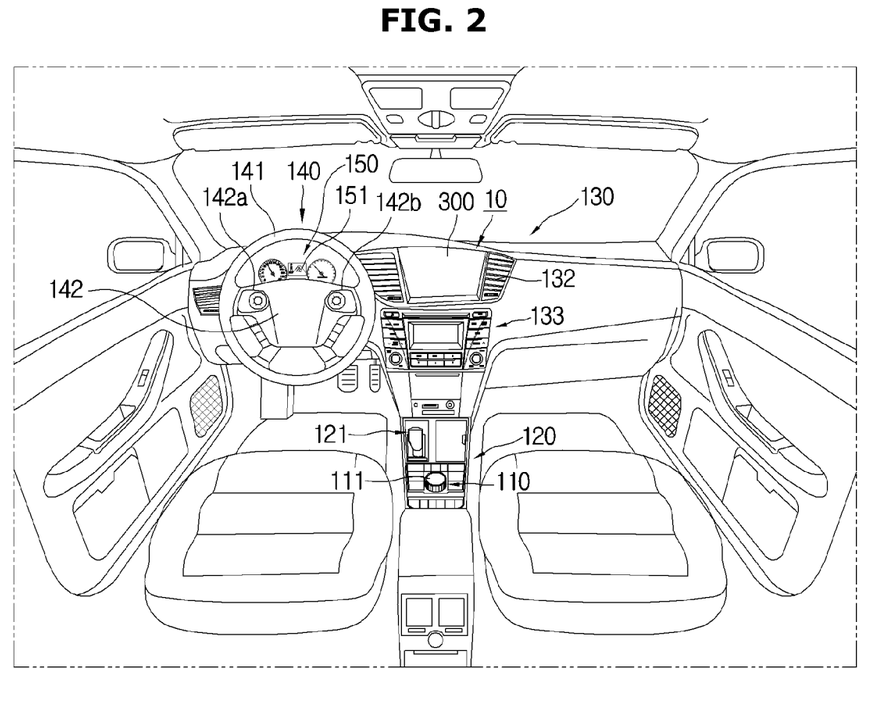
FIG. 2 is a view illustrating a configuration of the inside of the vehicle according to the present disclosure.

FIG. 1 is a view illustrating an exterior of a vehicle according to one embodiment, and FIG. 2 is a view illustrating a configuration of the inside of the vehicle according to one embodiment;

Referring to FIG. 1, a vehicle 100 according to one embodiment of the present disclosure includes a body 1 which forms an exterior of a vehicle 100, wheels 51 and 52 which move the vehicle 100, a driving device 80 which rotates the wheel 51 and 52, doors 71 which shield the inside of the vehicle 100 from the outside, a front glass 30 which provides a view ahead of the vehicle 100 to a driver inside the vehicle 100, and side mirrors 81 and 82 which provide a view in a rearward direction of the vehicle 100 to the driver.

The wheels 51 and 52 include a front wheel 51 provided in the front of the vehicle 100 and a rear wheel 52 provided in the rear of the vehicle 100.

A driving device 80 provides rotatory power to the front wheel 51 or rear wheel 52 so that the body 1 moves in a forward or rearward direction. The driving device 80 may include an engine which burns fossil fuel to generate the rotatory power or a motor which receives power from an electric condenser (not shown) to generate the rotatory power.

The doors 71 are provided on left and right sides of the body 1. When the door 71 is open, a driver may enter the vehicle 100, and when the door 71 is closed, the inside of the vehicle 100 is shielded from the outside.

The front glass 30 referred to as a windshield glass is provided at a forward top side of the body 1. The driver inside the vehicle 100 is able to see a view of the front of the vehicle 100 through the front glass 30. Further, the side mirrors 81 and 82 includes a left side mirror 81 provided on a left side of the body 1 and a right side mirror 82 provided on a right side thereof. The driver inside the vehicle 100 is able to visually check conditions in lateral and rearward directions of the vehicle 100 through the side mirrors 81 and 82.

In addition, the vehicle 100 may include various sensors which sense obstacles near the vehicle 100 to support a driver for recognizing conditions near the vehicle 100. Further, the vehicle 100 may include various sensors capable of sensing driving information of the vehicle such as a speed of the vehicle. Furthermore, the vehicle 100 may include a sensor which obtains images of environments near the vehicle 100.

Referring to FIG. 2, the vehicle 100 may include a dashboard provided with a gear box 120, a center fascia 130, a steering wheel 140, instrument panels 150, etc.

A gear lever 121 for changing the speed of the vehicle 100 may be installed in the gear box 120. Further, as shown in the drawing, a dial operation unit 111 is provided so that a user may control functions of a multimedia device including a navigation system 10, an audio device 133, etc., or control main functions of the vehicle 100, and an input unit 110 including various buttons may be installed in the gear box 120.

An air conditioner 132, an audio device 133, a navigation system 10, and so on may be installed in the center fascia 130.

The air conditioner 132 adjusts a temperature, humidity, air cleanliness, and air flow inside the vehicle 100, and thus maintains a comfortable interior of the vehicle 100. The air conditioner 132 is installed in the center fascia 130 and may include at least one outlet which discharges the air. The center fascia 130 may be provided with buttons, a dial, or the like for controlling the air conditioner 132, etc. A user, such as a driver, etc., may control the air conditioner 132 of the vehicle 100 using the buttons or dial disposed in the center fascia 130. Further, the air conditioner 132 may be controlled using buttons of the input unit 110 and the dial operation unit 111 installed in the gear box 120.

According to one form, the navigation system 10 may be installed in the center fascia 130. The navigation system 10 may be embedded and formed in the center fascia 130 of the vehicle 100. In one form, an input unit for controlling the navigation system 10 may be installed in the center fascia 130. In another form, the input unit of the navigation system 10 may be installed at a position other than the center fascia 130. For example, the input unit of the navigation system 10 may be formed near the display 300 of the navigation system 10. In another example, the input unit of the navigation system 10 may be installed in the gear box 120, etc.

The steering wheel 140 is a device for adjusting a driving direction of the vehicle 100, and may include a rim 141 to be griped by a driver and a spoke 142 which is connected to a steering device of the vehicle 100 and connects the rim 141 and a hub of a rotational shaft for steering. In one embodiment, the spoke 142 may be provided with operating devices 142a and 142b for controlling various types of devices in the vehicle 100, e.g., an audio device, etc. Further, the dashboard may be provided with various types of instrument panels 150 for displaying a driving speed, an engine revolutions per minute (RPM), a fuel level, or the like of the vehicle 100. The instrument panels 150 may include an instrument panels display 151 which displays a state of a vehicle, information associated with driving the vehicle, information associated with the operation of a multimedia device, etc.

A driver may operate the above-described various devices provided in the dashboard to drive the vehicle 100. The vehicle 100 may be provided with various sensors which sense information outside of the vehicle 100 or the driving information of the vehicle 100 for driving the vehicle 100, in addition to the devices needed for driving the vehicle 100 that may be operated by the driver as shown in FIG. 2.

The vehicle according to the present disclosure may perform autonomous driving based on information sensed by various sensors without driver intervention. We have discovered that even if correctly sensing the distance to a front vehicle for autonomous driving is necessary, there is a difficulty to correctly sense the distance to the front vehicle when the front vehicle has a great height, e.g., a truck. The present disclosure provides a vehicle that determines whether the front vehicle is a vehicle having a great height using a distance sensor to adjust the distance to the front vehicle, and a method of controlling the same.

Figure 3:
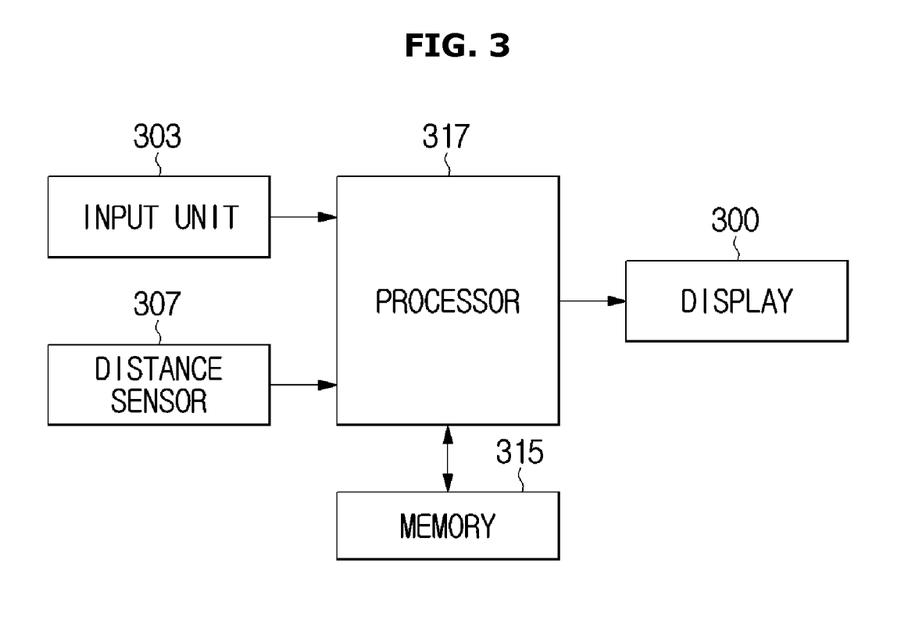
FIG. 3 is a control block diagram of a vehicle according to one embodiment.
Figure 4A:
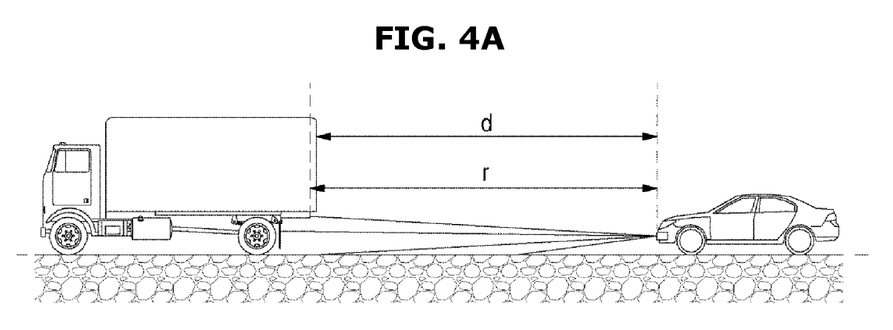
FIGS. 4A and 4B are conceptual views illustrating a distance to a vehicle having a great height recognized by the vehicle according to one embodiment.
Figure 4B:
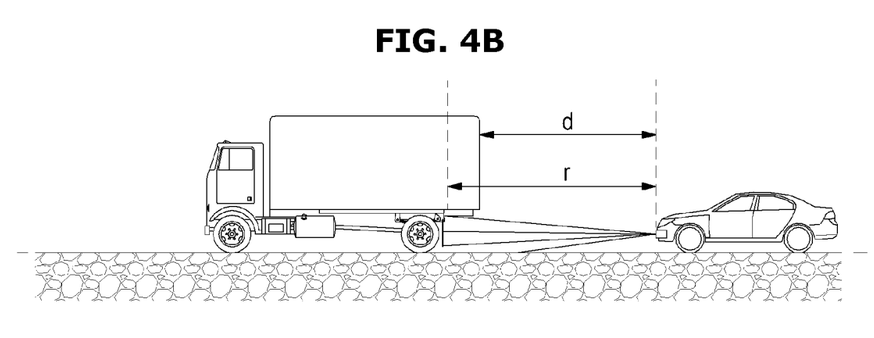
Figure 5A:
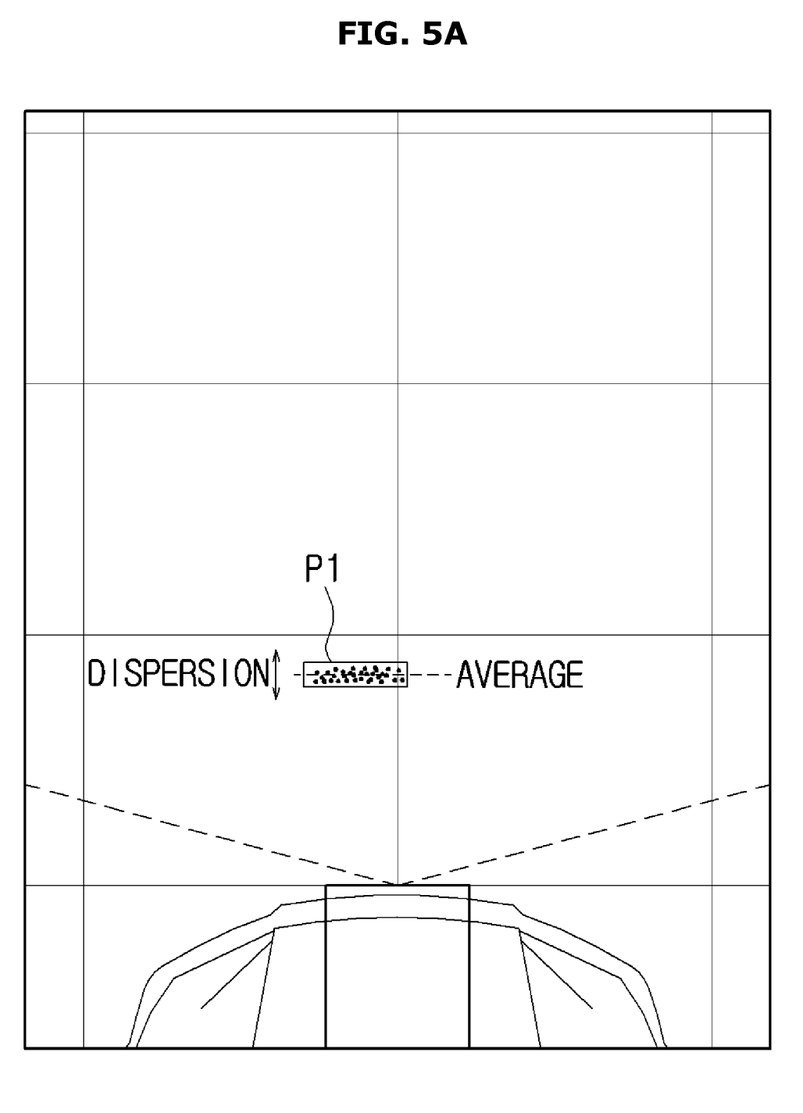
FIGS. 5A and 5B are views illustrating data sensed by a distance sensor of the vehicle according to one embodiment.
Figure 5B:
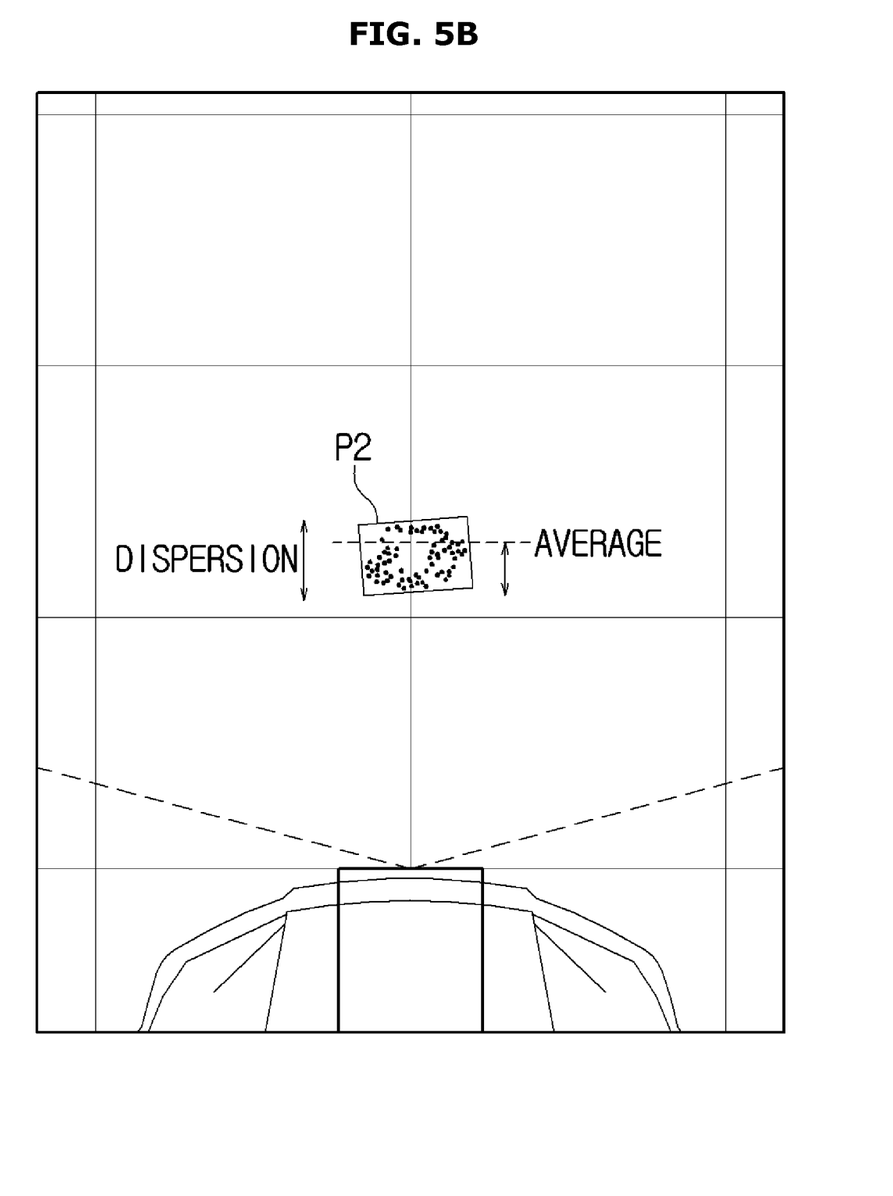
Figure 6A:
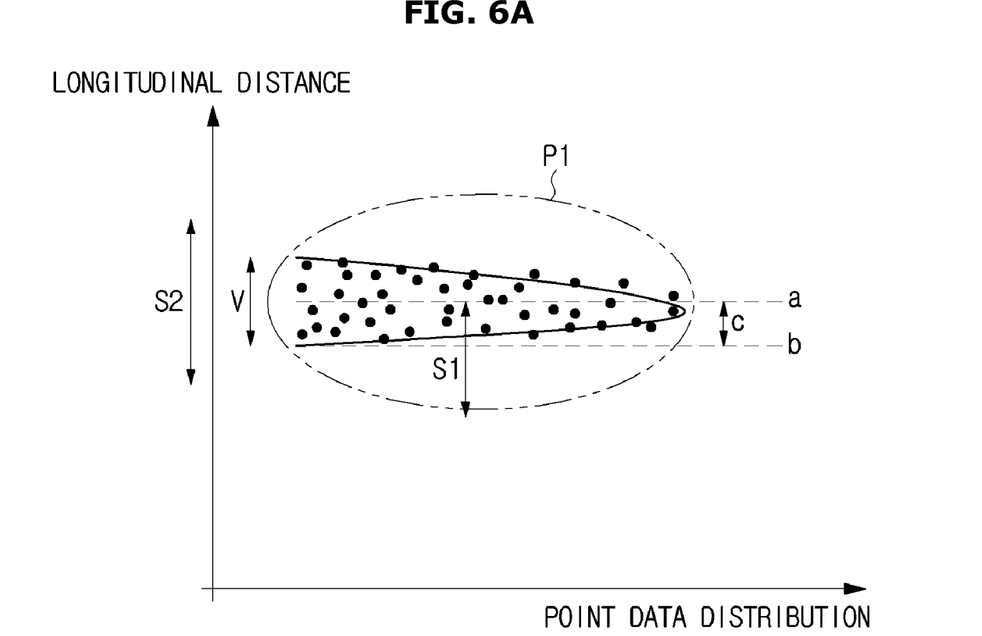
FIGS. 6A and 6B each are a view illustrating an average and a dispersion of the data distribution sensed by the distance sensor of the vehicle according to one embodiment.
Figure 6B:
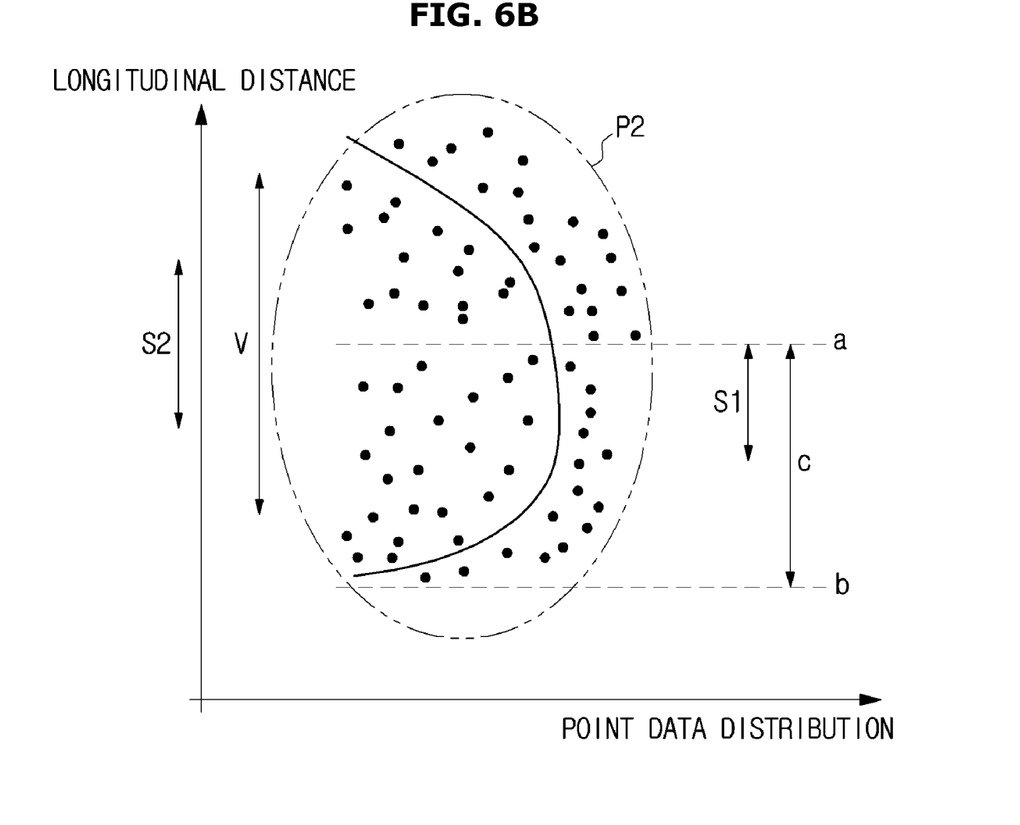
Figure 7:
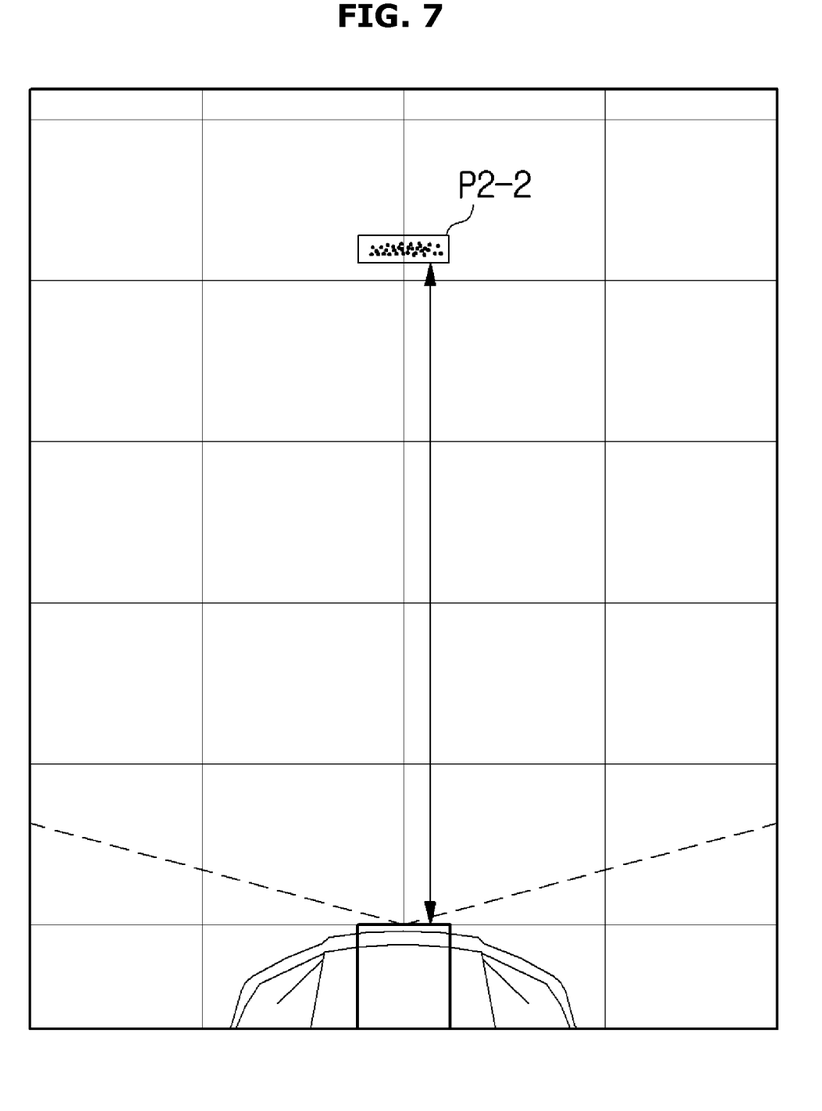
FIG. 7 is a view illustrating data sensed by the distance sensor when a distance between the vehicle according to one embodiment and a front vehicle is a predetermined distance or more.

FIG. 3 is a control block diagram of a vehicle according to one embodiment, and FIGS. 4A and 4B are conceptual views illustrating a distance to a vehicle having a great height sensed by the vehicle according to one embodiment. FIGS. 5A and 5B are views illustrating data sensed by a distance sensor of the vehicle according to one embodiment, and FIGS. 6A and 6B each are a view illustrating an average and a dispersion of the data distribution sensed by the distance sensor of the vehicle according to one embodiment. In addition, FIG. 7 is a view illustrating data sensed by the distance sensor when a distance between the vehicle according to one embodiment and a front vehicle is a predetermined distance or more.

As shown in FIG. 3, the vehicle according to the disclosed embodiment includes an input unit 303 which receives input in an autonomous driving mode, a distance sensor 307 which senses a vehicle in front or an obstacle, a processor 317 which senses a driving lane based on information obtained from the distance sensor 307, and a display 300 which displays various types of information associated with driving the vehicle.

The input unit 303 may be provided for a user to input a command that turns on the autonomous driving mode.

The input unit 303 may be provided in a center fascia, a gear box, or a steering wheel, and may be implemented as various types such as buttons of a hard or soft key type, a toggle switch, a dial, a speech recognition device, a motion recognition device, etc.

The input unit 303 may receive input which selects one of an autonomous driving mode and a manual driving mode where a driver directly drives a vehicle. That is, the driver may select the autonomous driving mode by operating the input unit 303 while directly driving the vehicle in the manual driving mode, and may select the manual driving mode while driving the vehicle in the autonomous driving mode to again directly drive the vehicle. When the autonomous driving mode is switched to the manual driving mode, the processor 317 may inform the driver that the mode is switched through the display 300, or a speaker, etc.

The distance sensor 307 may sense an object outside a vehicle, e.g., a front vehicle being driven in front of the vehicle, a road, a fixed object including a structure installed near the road, etc., a vehicle approaching from an opposite lane. The distance sensor 307 may sense a signal reflected from a lane marking of a road or a road surface, from which data including the road surface or the lane data may be calculated. The distance sensor 307 may include a radar or light detection and ranging (LiDAR) device, and the LiDAR implementation may be used for a precise measurement. In one form, the distance sensor 307 may be implemented by a multi-layer LiDAR device which projects a multi-layer laser in a vertical direction.

When a command which selects an autonomous driving mode is input through the input unit 303 or a command which selects a cruise control function or the like is input, the processor 317 detects a lane using data calculated from the distance sensor 307 and determines a front vehicle. Further, even when a separate command for performing the above-described functions has not been input, when a vehicle is being driven, the processor 317 may still detect a lane using the data calculated from the distance sensor 307 and determine the front vehicle.

When a vehicle is being driven in autonomous driving mode, under the cruise control, etc., it is important to correctly sense a distance to a front vehicle. As shown in FIG. 4A, when a front vehicle is a vehicle having a great height such as a truck, and a distance between a subject vehicle and the front vehicle is a specific distance or more, a distance "r" to the front vehicle sensed by the distance sensor may correspond to an actual distance "d". However, as shown in FIG. 4B, when the distance between the subject vehicle and the front vehicle is less than the specific distance, the distance sensor may incorrectly sense the distance between the subject vehicle and the front vehicle to be greater than an actual distance.

As shown in FIG. 4A, when the distance between the subject vehicle and the front vehicle is maintained such that the rear of the front vehicle may be sensed by the distance sensor, the distance to the front vehicle sensed by the distance sensor may correspond to an actual distance. However, as shown in FIG. 4B, when the front vehicle is a truck having a great height, and the distance between the subject vehicle and the front vehicle is close to each other, since the distance sensor senses a lower portion of or the tires of the front vehicle, the distance to the front vehicle sensed by the distance sensor may be greater than an actual distance.

As described above, when the front vehicle is a vehicle having a great height, such as a truck, there is a difference between the distance to the front vehicle sensed by the distance sensor and the actual distance, and thus a safety problem may occur when the autonomous driving mode is used or the cruise control function is performed based on the distance to the front vehicle sensed by the distance sensor.

When data is obtained by the distance sensor of the vehicle, the processor first removes noise included in the data obtained by the distance sensor. Since the data obtained by the distance sensor includes ground surface data and the like, the processor first removes such data and the useless noise. Then, a grouping algorithm is applied to the data from which the noise has been removed, and the data in dot form is changed to data in a box object shape. FIGS. 5A and 5B show data to which the grouping algorithm is applied, and an object represented by the box shape which is the data generated by applying the grouping algorithm corresponds to the front vehicle.

The processor determines a vehicle being driven in the same lane immediately in front to be a front vehicle. The processor may sense a vehicle being driven in front of the subject vehicle in the same lane using the lane information included in the data obtained by the distance sensor to determine that the vehicle is the front vehicle. Alternatively, the processor may also estimate a trajectory of the subject vehicle, and may determine that a vehicle being driven in front of the subject vehicle on the estimated trajectory is the front vehicle.

As described above, the processor generates data in the object form by grouping the data points from the distance sensor to determine a front vehicle, analyzes the points representing the front vehicle, and determines whether the front vehicle is a vehicle having a great height such as a truck.

The processor calculates distances between the distance sensor and the data points forming the front vehicle and calculates an average distance. The processor calculates a dispersion of the data representing the front vehicle using the calculated average distance. Further, the processor determines the closest data point to the distance sensor in the data representing the front vehicle and calculates a distance between the data point closest to the distance sensor and the above-described average.

Referring to FIG. 5A, it shows that a dispersion of data P1 representing the front vehicle is small. FIG. 6A illustrates the distribution of the data P1 of the front vehicle shown in FIG. 5A in more detail. Referring to FIG. 6A, it shows that data points are densely distributed near an average of the data of the front vehicle, i.e., near an average distance from the distance sensor. That is, it shows that a dispersion V of data of the front vehicle is smaller than a pre-stored reference dispersion S2. Further, it shows that a distance C between the closest data point to the distance sensor and the above-described average distance is smaller than a pre-stored reference distance S1.

When the distribution of the front vehicle is as shown in the distribution of data shown in FIGS. 5A and 6A, the processor may determine that the front vehicle is a vehicle having a small height such as a sedan. Actually, data representing a vehicle having a small height, such as a sedan, is sensed by the distance sensor as a distribution with a small dispersion as shown in FIG. 5A.

Meanwhile, referring to FIG. 5B, it shows that a dispersion of data P2 representing the front vehicle is greater than that of the data shown in FIG. 5A. FIG. 6B illustrates the distribution of data P2 of the front vehicle shown in FIG. 5B in more detail. Referring to FIG. 6B, it shows that data points are not densely distributed near an average of the data of the front vehicle, i.e., near an average distance from the distance sensor. That is, it shows that a dispersion V of the data of the front vehicle is greater than a pre-stored reference dispersion S2. Further, a distance C between a data point closest to the distance sensor and the above-described average distance also is greater than a pre-stored reference distance S1.

When the distribution of the data of the front vehicle shows the distribution such as shown in FIGS. 5B and 6B, the processor may determine that the front vehicle is a vehicle having a great height such as a truck. Actual data for a vehicle having a great height, such as a truck, which is sensed by the distance sensor, has a distribution with the large dispersion shown in FIG. 5B.

When the distribution of the data of the front vehicle shows the distribution such as shown in FIGS. 5B and 6B, the processor controls a driving device for maintaining the distance between the subject vehicle and the front vehicle at a predetermined distance or more. As shown in FIG. 4A, the reason is that the distance sensor may correctly sense the distance to the front vehicle when the distance between the subject vehicle and the front vehicle is the specific distance or more. The predetermined distance is a set distance for more accurately sensing the distance to the front vehicle and may be pre-stored in a memory for each vehicle type. Alternatively, the processor may calculate the distance to the front vehicle to be maintained in real time using the data of the front vehicle and may control the driving device based thereupon.

FIG. 7 illustrates data obtained by a distance sensor after a front vehicle is determined as a vehicle having a great height, and the distance to the front vehicle is maintained to be a preset distance or more.

As shown in FIG. 7, it shows that the distribution of data P2-2 of the front vehicle does not show the distribution of the data dispersed as shown in FIGS. 5B and 6B, and shows a data distribution similar to the data distribution shown in FIGS. 5A and 6A. Thus, when the front vehicle is determined as a vehicle having a great height and a distance to the front vehicle is maintained at a distance equal to or more than a predetermined distance, the distance to the front vehicle may be more accurately sensed.

Figure 8:
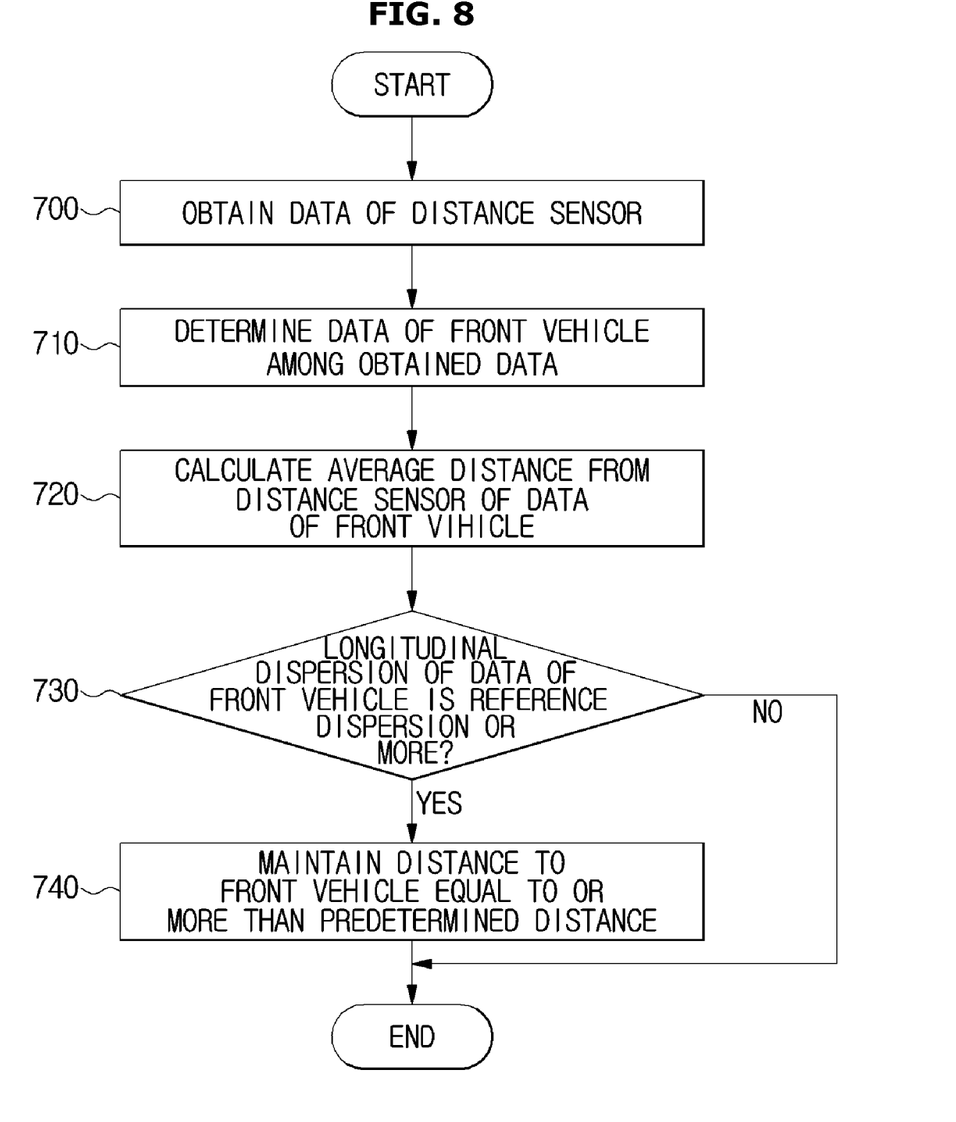
FIG. 8 is a flowchart illustrating a method of controlling a vehicle according to one embodiment.

FIG. 8 is a flowchart illustrating a method of controlling a vehicle.

As shown in FIG. 8, when data is obtained by a distance sensor (S700), the processor determines data of a front vehicle among the obtained data (S710).

When data is obtained by the distance sensor of the vehicle, the processor first removes noise included in the data obtained by the distance sensor. Since the data obtained by the distance sensor include data of the ground surface and the like, the processor first removes such data and the useless noise. Then, a grouping algorithm is applied to the data from which the noise is removed, and data in a dot form is changed to data in box object shape. FIGS. 5A and 5B show data to which the grouping algorithm is applied, and an object represented by the box shape which is data generated by applying the grouping algorithm corresponds to a front vehicle.

The processor determines that a vehicle being driven immediately in front of a subject vehicle in the same lane is a front vehicle. The processor may detect the vehicle being driven in front of the subject vehicle in the same lane using lane information included in the data obtained by the distance sensor and determine that the vehicle is the front vehicle. Alternatively, the processor may estimate a trajectory of the subject vehicle, and may also determine that a vehicle being driven in front of the subject vehicle on the estimated trajectory is the front vehicle.

The processor calculates an average distance from data of the determined front vehicle to the distance sensor (S720), and when a longitudinal dispersion of the data of the front vehicle is the reference dispersion or greater (S730), the distance to the front vehicle is maintained at a predetermined distance or more (S740).

As is apparent from the above description, a vehicle and a method of controlling the same according to the disclosed embodiment can accurately sense a distance to a front vehicle even when a height of the front vehicle is great.

Although a few embodiments of the present disclosure have been shown and described, it would be appreciated by those skilled in the art that changes may be made in these embodiments without departing from the principles and spirit of the present disclosure.

What is claimed is:

1. A vehicle comprising:
    a distance sensor configured to acquire distance information regarding a target object positioned near the vehicle; and
    a processor configured to;
        determine data points representing a front vehicle from data obtained by the distance sensor,
        calculate a longitudinal dispersion value of the data points of the front vehicle,
        determine whether a height of the front vehicle is equal to or greater than a predetermined vehicle height,
        in response to determining the height of the front vehicle being equal to or greater than the predetermined vehicle height, control the vehicle to maintain a distance to the front vehicle to be greater than or equal to a predetermined distance, and
        determine that the height of the front vehicle is equal to or greater than the predetermined vehicle height when the longitudinal dispersion value is equal to or greater than a reference dispersion value,
    wherein the processor is further configured to:
        calculate distances between the distance sensor and the data points representing the front vehicle and calculate an average distance based on the calculated distances,
        determine a closest data point to the distance sensor among the data points representing the front vehicle,
        maintain the distance to the front vehicle to be equal to or greater than the predetermined distance when a distance between the closest data point to the distance sensor and the average distance is greater than or equal to a predetermined reference distance,
        calculate the distance to the front vehicle to decrease the longitudinal dispersion value to a value less than the reference dispersion value, and
        maintain the distance to the front vehicle greater than or equal to the calculated distance when the longitudinal dispersion value is the reference dispersion value or more.

2. The vehicle of claim 1, wherein the processor is configured to calculate the longitudinal dispersion value of the data points representing the front vehicle based on the average distance.

3. The vehicle of claim 1, wherein the distance sensor includes a multi-layer light detection and ranging (multi-layer LiDAR) device.

4. The vehicle of claim 1, wherein the processor is configured to estimate a trajectory of a subject vehicle, and determine that a vehicle positioned on the estimated trajectory is the front vehicle.

5. The vehicle of claim 1, wherein the processor is configured to determine a lane in which a subject vehicle is being driven using data sensed by the distance sensor, and determine that a vehicle being driven in or entering the determined lane is the front vehicle.

6. The vehicle of claim 1, further comprising a memory storing information on the distance to the front vehicle determined by a type of the front vehicle, wherein the processor is configured to maintain the distance to the front vehicle to be greater than or equal to the distance to the front vehicle stored in the memory when the longitudinal dispersion value is the reference dispersion value or more.

7. A vehicle comprising:
    a distance sensor configured to acquire distance information regarding a target object positioned near the vehicle; and
    a processor configured to determine whether a height of a front vehicle is equal to or greater than a predetermined vehicle height and configured to control the vehicle to maintain a distance to the front vehicle greater than or equal to a predetermined distance in response to determining the height of the front vehicle being equal to or greater than the predetermined vehicle height,
    wherein the processor is further configured to:
        calculate distances between the distance sensor and the data points representing the front vehicle and calculate an average distance based on the calculated distances,
        determine a closest data point to the distance sensor among the data points representing the front vehicle,
        maintain the distance to the front vehicle to be equal to or greater than the predetermined distance when a distance between the closest data point to the distance sensor and the average distance is greater than or equal to a predetermined reference distance,
        determine that the height of the front vehicle is equal to or greater than the predetermined vehicle height when a longitudinal dispersion value is equal to or greater than a reference dispersion value,
        calculate the distance to the front vehicle to decrease the longitudinal dispersion value to a value less than the reference dispersion value, and
        maintain the distance to the front vehicle greater than or equal to the calculated distance when the longitudinal dispersion value is the reference dispersion value or more.

8. The vehicle of claim 7, wherein the processor is configured to calculate the longitudinal dispersion value of the data points representing the front vehicle based on the average distance.

9. The vehicle of claim 7, wherein the processor is configured to determine that the height of the front vehicle is equal to or greater than the predetermined vehicle height when the distance between the closest data point to the distance sensor and the average distance is equal to or greater than the predetermined reference distance.

10. A method of controlling a vehicle, comprising:
    determining, by a processor, data points representing a front vehicle using data obtained by a distance sensor that is configured to acquire distance information regarding a target object positioned near the vehicle;
    determining, by the processor, whether a height of the front vehicle is equal to or greater than a predetermined vehicle height;
    controlling the vehicle, by the processor, to maintain a distance to the front vehicle greater than or equal to a predetermined distance when the height of the front vehicle is equal to or greater than the predetermined vehicle height;

calculating, by the processor, distances between the distance sensor and the data points representing the front vehicle;

calculating, by the processor, an average distance based on the calculated distances; and determining, by the processor, a closest data point to the distance sensor among the data points representing the front vehicle, wherein the height of the front vehicle is determined as being equal to or greater than the predetermined vehicle height when a distance between the closest data point to the distance sensor and the average distance is equal to or greater than a predetermined reference distance, and wherein the determining whether the height of the front vehicle is equal to or greater than the predetermined vehicle height includes:

calculating a longitudinal dispersion value of the data points representing the front vehicle; and determining that the height of the front vehicle is equal to or greater than the predetermined vehicle height when the calculated longitudinal dispersion value is equal to or greater than a reference dispersion value;

calculating the distance to the front vehicle to decrease the longitudinal dispersion value to a value less than the reference dispersion value; and maintaining the distance to the front vehicle to be greater than or equal to the calculated distance when the longitudinal dispersion value is the reference dispersion value or more.

11. The method of claim 10, wherein the calculating of the longitudinal dispersion value of the front vehicle data includes:

calculating a longitudinal dispersion value of the data points of the front vehicle based on the average distance.

12. The method of claim 10, wherein the determining of the data points representing the front vehicle includes:

estimating a trajectory of a subject vehicle; and determining that a vehicle positioned on the estimated trajectory is the front vehicle.

13. The method of claim 10, wherein the determining of the data points representing the front vehicle includes:

determining a lane in which a subject vehicle is being driven using data sensed by the distance sensor; and determining that a vehicle being driven on or entering the determined lane is the front vehicle.

* * * * *